3,282,981
ACTIVATED ADDITION OF HYDROGEN CYANIDE TO OLEFINS

Darwin Darrell Davis, Orange, Tex., assignor to E. I. du Pont de Nemours and Company, Wilmington, Del., a corporation of Delaware
No Drawing. Filed Oct. 23, 1963, Ser. No. 318,188
2 Claims. (Cl. 260—465.3)

This invention relates to the production of aliphatic nitriles by the catalytic addition of hydrogen cyanide to olefins.

In a copending application, Serial No. 318,177, filed October 23, 1963, it has been disclosed that nickel cyanide, which optionally may be supported on an inert support such as gamma alumina or carbon, is an effective catalyst for the addition of hydrogen cyanide to olefins.

It has now been discovered that the addition of small amounts of hydrogen to the reaction mixture increases the rate of the reaction. Surprisingly little reduction of hydrocyanic acid to ammonia or of ethylene to ethane occurs when a mixture of hydrogen, hydrogen cyanide and ethylene is passed over a nickel cyanide catalyst. In particular, very little ethylene is converted to ethane when hydrogen cyanide is the major component of the mixture.

Accordingly, in its broadest aspect this invention comprises passing a mixture comprising hydrogen cyanide, a lower aliphatic olefin, and hydrogen at about 1 to about 33% by volume of the total feed over a catalyst comprising nickel cyanide at a temperature in the range between 300° C. and 400° C. and thereafter recovering from the reaction product an organic nitrile formed by the addition of hydrogen cyanide to the olefin.

The nickel cyanide catalyst may be formed by impregnating a porous support with a soluble nickel salt such as nickel chloride, nickel sulphate, or the like, adding the stoichiometric quantity of an alkali metal cyanide, washing with water and drying. Preferably, however, the catalyst is made by cyaniding nickel oxide by passing hydrogen cyanide over the supported nickel oxide at a temperature in excess of 300° C., and preferably heating the catalyst either during or subsequent to its function to a temperature in the range between 400° C. and 600° C. Catalysts prepared by cyaniding and heating to temperatures greater than 400° C. are black in color and have greater activity and a longer life than catalysts formed at lower temperatures.

The catalysts employed in this invention may be used for several hours depending on the feedstock, temperature, and the like reaction variables. In most instances productivity can be maintained and a longer catalyst life had by initially running at a relatively low temperature in the prescribed range and thereafter increasing the temperature as the catalyst activity decreases. When catalyst activity has dropped below acceptable levels, the catalyst may be regenerated by first calcining in an oxygen-containing atmosphere at a temperature in the range between about 500° C. and 800° C. A rapid conversion of the catalyst can be had, for example, by calcining in a mixture of water vapor and air at 700° C. After calcining the catalyst as described hereinabove, the regeneration is completed by cyaniding as in the preparation of fresh catalyst.

The olefins to which this reaction is applicable are 1-olefins having from 2 to 4 carbon atoms, i.e., ethylene, propylene, butene-1 and butadiene, of which ethylene is preferred.

The ratio of olefin to hydrogen cyanide is not highly critical, and the hydrogen activated addition to hydrogen cyanide to olefins may be performed even in the presence of excess olefin, with surprisingly small loss of olefin to the corresponding saturated alkane.

Thus at 300° C. with a molar excess of ethylene over hydrogen cyanide and an amount of hydrogen equal to that of the ethylene, the conversion of ethylene to ethane over a 10% nickel cyanide on alumina catalyst is only about ½%, increasing to about 2% at 335° C., and thereafter increasing rapidly to about 18% at 390° C. Ethylene conversion to propionitrile was 18–76% in this series.

The use of excess hydrogen cyanide, however, is preferred, and minimizes the loss of olefin to saturated alkane. Thus, with a molar excess of hydrogen cyanide, the loss of ethylene to ethane, using a volume of hydrogen equal to the ethylene, is only about 3% at a temperature of 390° C. Accordingly it is preferred to employ a molar ratio (i.e., substantially a gas volume ratio) of hydrogen cyanide to ethylene of greater than 1 and preferably between about 1 and about 2.

Hydrogen cyanide has been found to add to lower aliphatic olefins, in the presence of active nickel cyanide catalysts, at rates acceptable for continuous operation at temperatures greater than about 250° C. However, at temperatures below about 300° C. the addition of hydrogen to the olefin-hydrogen cyanide feed gas system has very little effect. Above about 300° C. very substantial improvements in the degree of conversion is achieved with a given catalyst result. Accordingly, the reaction should be conducted at temperatures of 300° C. to about 400° C. and preferably at temperatures in the range between about 300° C. and 350° C. wherein very high levels of conversion may be attained with negligible reduction of olefin to saturated alkane.

The pressure at which the reaction is performed has very little effect on the degree of conversion or the loss of olefin to saturated paraffin. Successful operation may be had at atmospheric pressure, subatmospheric pressures or at high pressures, i.e., up to about 1000 p.s.i. However, it is preferred to operate at about atmospheric pressure. Other gases such as nitrogen, the noble gases, lower alkanes, carbon monoxide, carbon dioxide, ammonia, and minor amounts of hydrogen sulphide have little effect on reaction rates. Accordingly, feeds of cracked petroleum gases and other unrefined mixtures containing olefins may be employed as feedstock in the manufacturing process of this invention.

A substantial amount of hydrogen should be employed i.e., from about 1 to 33% by volume or more of the feed, but is not highly critical.

This invention is further illustrated by the following examples which are not, however, intended to fully delineate the scope of this discovery.

Example 1

The following example was carried out at about atmospheric pressure. The feed system comprised a line fed by cylinders of ethylene and hydrogen which were metered into the line through rotometers. Hydrogen cyanide was introduced by bubbling the gas through a bubbler containing liquid hydrogen cyanide and maintained at constant temperature. The bubbler was weighed at the beginning and end of each run to determine the total amount of hydrogen cyanide consumed.

The reaction mixture was then passed over the catalyst bed maintained in a one inch diameter hard glass reaction tube fitted with a ¼" outside diameter thermometer well. The catalyst consisted of commercially obtainable pellets of gamma alumina containing 10% by weight of nickel oxide which was cyanided by passing nitrogen containing about 33% by volume of hydrogen cyanide over the pellet bed at a temperature of about 370° C.

The exit was from the reactor passed through a heated tube (to prevent condensation of propionitrile) to a analytical equipment. The product gas stream was analyzed by gas chromatographic techniques for propionitrile and unreacted ethylene and hydrogen cyanide, thus permitting the calculation of conversion levels. Hydrogen cyanide was also determined by a wet chemical method which involved scrubbing the gas with a 1:1 mixture of toluene and acetic acid and titration of the solution for cyanide by the standard silver nitrate-potassium iodide method.

A control run was made at a temperature of 334° C. using a feed consisting of 24.5 mole percent of hydrogen cyanide, 22.5 mole percent of ethylene and a methane carrier. The contact time was 6.4 seconds. A 20% conversion of ethylene to propionitrile was obtained, while an 18% conversion of hydrogen cyanide to propionitrile was obtained. No acrylonitrile or acetonitrile, the usual side products, could be detected.

A second run was made at 335° C. using a feed consisting of 17.8 mole percent HCN, 19.6 mole percent of ethylene, 17 mole percent of hydrogen and the balance methane. The conversion of ethylene to propionitrile was 47% and the conversion of hydrogen cyanide to propionitrile was 50%. The yield based on ethylene was substantially quantitative with a production of less than four moles of ethane per hundred moles of propionitrile. Note that the ethylene was in excess here. The contact time was 5.7 seconds. In this case the conversion rate was more than doubled over that obtained in the absence of hydrogen.

*Example 2*

Using the same apparatus and a catalyst prepared in the same manner as in Example 1 a feed consisting of 26 moles percent of HCN, 21.4% ethylene and the balance methane carrier was passed over a nickel cyanide catalyst prepared by cyaniding nickel oxide on gamma alumina at a temperature of 370° C. The temperature of the catalyst was maintained at about 318° C. After an hour the percentage conversion based on HCN had levelled out at 39%. Contact time was about 4 seconds. Hydrogen was then injected into the system so that the composition of the feed gas was 21.4 moles percent of HCN, 17.7 moles percent ethylene and 17.7 moles percent hydrogen. The percentage of hydrogen cyanide converted to propionitrile immediately increased and after 15 minutes reached a level of 80–82%, which corresponds to an essentially quantitative conversion of ethylene to propionitrile. About ½% of the ethylene was converted to ethane.

Aliphatic nitriles are well known organic chemicals which have a wide variety of uses as solvents and the like. They are important intermediates for the preparation of a broad spectrum of organic chemicals as described for example in the text, "The Chemistry of Organic Cyanogen Compounds" by V. Migridichian, American Chemical Society Monograph No. 105, Reinhold Publishing Co., 1947.

Many other modifications of this invention will be apparent to those skilled in the art.

I claim:
1. In the process of producing aliphatic nitriles by the addition of hydrogen cyanide to lower aliphatic olefins by contacting a mixture of hydrogen cyanide and a lower aliphatic olefin in contact with nickel cyanide as a catalyst at a temperature in the range between 300° C. and 400° C., the improvement which comprises adding from about 1 to about 33% by volume of hydrogen to the said mixture.
2. The process of claim 1 in which said lower aliphatic olefin is ethylene.

No references cited.

CHARLES B. PARKER, *Primary Examiner.*

JOSEPH P. BRUST, *Examiner.*